US005476252A

United States Patent [19]

Yonezawa

[11] Patent Number: 5,476,252

[45] Date of Patent: Dec. 19, 1995

[54] CLAMPING APPARATUS

[75] Inventor: Keitaro Yonezawa, Kobe, Japan

[73] Assignee: Kabushiki Kaisha Kosmek, Kobe, Japan

[21] Appl. No.: 287,533

[22] Filed: Aug. 8, 1994

[30] Foreign Application Priority Data

Jan. 18, 1994 [JP] Japan .................................... 6-003428

[51] Int. Cl.$^{6}$ ........................................ B23Q 3/08

[52] U.S. Cl. ........................................ 269/32

[58] Field of Search .......................... 269/32, 24, 91–94, 269/134–137, 238

[56] References Cited

U.S. PATENT DOCUMENTS

| | | | |
|---|---|---|---|
| 3,724,837 | 4/1973 | McPherson | 269/32 |
| 4,504,046 | 3/1985 | Yonezawa et al. . | |
| 4,506,871 | 3/1985 | Yonezawa . | |
| 4,826,146 | 5/1989 | Shirakawa . | |
| 4,932,640 | 6/1990 | Shirakawa . | |

*Primary Examiner*—Robert C. Watson
*Attorney, Agent, or Firm*—Bacon & Thomas

[57] ABSTRACT

A fulcrum portion (5*a*) provided in a midway portion of a clamp arm (5) in the left and right direction is supported vertically pivotably by a housing (3) through a pin (13). A first shaft (21) of a transmission member (18) is fitted into a driven portion (5*b*) provided in the right portion of the arm (5). A second shaft (22) of the transmission member (18) is so supported by support grooves (25) of the housing (3) through rollers (24) as to be movable in the front and rear direction. The first shaft (21) and a piston rod (50) of a pneumatic cylinder (6) are connected to each other by a lever (19). At the time of clamping, the first shaft (21) is eccentrically rotated clockwise about an axis (A) of the second shaft (22).

8 Claims, 14 Drawing Sheets

| AIR PRESSURE kgf/cm² | 0 | 1 | 2 | 3 | 4 | 5 | 6 |
|---|---|---|---|---|---|---|---|
| CLAMPING FORCE C (tf) | 2.0 | 3.4 | 5.0 | 6.6 | 8.4 | 9.8 | 11.3 |
| CANCELLATION FORCE C' (tf) | 3.4 | 5.8 | 8.2 | 9.6 | 11.0 | 13.0 | 15.0 |

CLAMPING APPARATUS

BACKGROUND OF THE INVENTION

1. Field of the Invention

The present invention relates to a clamping apparatus adapted to damp an object to be fixed such as a metal mold and a workpiece by a clamp arm of balancing type, and more specifically to a clamping apparatus of the type adapted to drive the clamp arm by a transmission member of an eccentric type.

2. Description of Prior Art

As such damping apparatus there has been known the one, for example as disclosed in the Japanese Patent Laid Open Publication No. 54-36680. As shown in FIG. 24, this apparatus is constituted as follows.

A clamping apparatus 102 extending in the front and rear direction (namely, in the left and right direction in FIG. 24, and the same shall apply hereinafter.) is fixedly secured onto a stationary table 101 of a processing machine, and a metal mold D is placed in front of a housing 103 of the clamping apparatus 102. The metal mold D is adapted to be pressed onto the upper surface of the stationary table 101 by a clamp arm 105. A fulcrum portion 105*a* is provided in a rear portion of the arm 105, and a driven portion 105*b* is provided in a midway portion of the arm 105 in the front and rear direction. The fulcrum portion 105*a* is supported vertically pivotably by the upper surface of a support block 113. A small diameter pin 122 is fitted eccentrically into a large diameter pin 121 fitted into the driven portion 105*b*, and the opposite end portions of the small diameter pin 122 are fixedly inserted into apertures (not illustrated) of the housing 103. The symbol A designates an axis of the small diameter pin 122, and the symbol B does an axis of the large diameter pin 121.

An upper end portion 119*a* of the lever 119 is fixedly secured to the large diameter pin 121, and a lower end portion 119*b* of the lever 119 is connected to a front end portion of a piston rod 150 of a double acting type hydraulic cylinder 106. A clamping actuation chamber 144 and an unclamping actuation chamber 146 are defined before and behind the piston 140 respectively. The symbol 145 designates a spring for holding a clamped condition.

Under an illustrated unclamped condition, while a pressurized oil is discharged from the clamping actuation chamber 144, the pressurized oil is supplied to the unclamping actuation chamber 146. Thereby, the arm 105 is returned to an unclamping position by a return spring 155.

When clamping the metal mold D by the arm 105, the pressurized oil is discharged from the unclamping actuation chamber 146 and the pressurized oil is supplied to the clamping actuation chamber 144 so that the piston 140 and the piston rod 150 are moved rightward. Thereby, the large diameter pin 121 is eccentrically rotated counterclockwise about the axis A of the small diameter pin 122 to strongly swing a clamping portion 105*c* downward.

Under the above-mentioned clamped condition, as indicated by an alternate long and two short dashes arrow-line in FIG. 24, while a clamping reaction force h acts from the metal mold D to the clamping portion 105*c*, a fulcrum reaction force f acts from the support block 113 to the fulcrum portion 105*a* as well as an operation reaction force g acts from the housing 103 to the driven portion 105*b* through the small diameter pin 122 and the large diameter pin 121. This operation reaction force g is expressed as g=h+f=h.(m+n)/n by balancing vertical forces and balancing moments.

There are, however, following problems associated with the above-mentioned conventional embodiment.

At the end of clamping operation, since the strong operation reaction force g obtained by adding a value of the fulcrum reaction force f to a value of the clamping reaction force h acts on the driven portion 105*b*, a large friction force acts between fitting surfaces of the clamp arm 105 and the large diameter pin 121 and a large friction force acts also between fitting surfaces of the large diameter pin 121 and the small diameter pin 122.

In order to drive the arm 105 against such large friction forces, it is necessary to manufacture the hydraulic cylinder 106 having a large capacity. As mentioned above, since the operation reaction force g is large, also a force acting on the small diameter pin 122 becomes large. Therefore, in order to receive that large force, it is necessary to increase a thickness of a front wall portion of the housing 103. Accordingly, also a length of the housing 103 in the front and rear direction becomes longer.

As noted above, since driving means such as the hydraulic cylinder 106 is large in capacity and also the length of the housing 103 in the front and rear direction is long, the clamping apparatus 102 is large in size and heavy in weight.

SUMMARY OF THE INVENTION

It is an object of the present invention to provide a clamping apparatus which is small in size and light in weight.

For accomplishing the above-mentioned object, a clamping apparatus is constituted as follows. For example as shown in FIGS. 1 through 6, in FIG. 10, in FIGS. 11 through 14 or in FIGS. 18 through 20 respectively, a fulcrum portion 5*a* is provided in the midway portion of a clamp arm 5 in the front and rear direction, and the fulcrum portion 5*a* is supported vertically pivotably by a housing 3. A driven portion 5*b* is provided in the rear portion of the clamp arm 5, and a first shaft 21 of a transmission member 18 is transmittably engaged with the driven portion 5*b*. A second shaft 22 of the transmission member 18 is supported by the housing 3. The first shaft 21 is adapted to be eccentrically rotated about the axis A of the second shaft 22 by an output portion 6*a* of driving means 6 through a lever 19.

Incidentally, as the driving means 6, a fluid pressure cylinder such as a pneumatic cylinder and a hydraulic cylinder or a mechanism adapted to advance and retreat through the screw engagement between an external thread and an internal thread can be employed.

The first shaft 21 and the second shaft 22 can be formed integrally (refer to FIG. 6) or formed separately (refer to FIG. 14).

The lever 19 can be formed separately from the first shaft 21 (refer to FIG. 6) or formed integrally with the first shaft 21 (refer to FIG. 14).

The present invention, for example as shown in FIG. 1 (or FIGS. 11 and 12), functions as follows.

When changing over the clamp arm 5 from the unclamped condition illustrated in FIG. 1 (*b*) to the clamped condition illustrated in FIG. 1 (*c*), the output portion 6*a* of the driving means 6 is made to advance forward (leftward in Figs.). Thereupon, as shown in FIG. 1 (*c*), the lever 19 is swung clockwise so that the first shaft 21 is rotated clockwise about the axis A of the second shaft 22. Thereby, the driven portion 5b of the arm 5 is swung upward about the fulcrum portion 5a and the clamping portion 5c is swung downward for clamping about the fulcrum portion 5a.

Under the damped condition, while a clamping reaction force H acts from an object D to be fixed such as a metal mold to a clamping portion 5c, a fulcrum reaction force F acts from the housing 3 to the fulcrum portion 5a as well as an operation reaction force G acts from the housing 3 to the driven portion 5b through the second shaft 22 and the first shaft 21.

The operation reaction force G is expressed as $$G=F-H=H.M/N \qquad \text{equation ②}$$

by balancing vertical forces and balancing moments.

Therefore, the operation reaction force G becomes smaller than the fulcrum reaction force F by the clamping reaction force H. In addition thereto, the operation reaction force G becomes smaller than the clamping reaction force H by making a value of the leverage (M/N) of the clamp arm 5 smaller than 1.

Thereupon, in order to compare the present invention with the conventional embodiment (refer to FIG. 24), when H=h, M=m and N=n are presented, the operation reaction force g in the conventional embodiment is expressed as $$g=h.(m+n)/n=H.(M+N)/N=(H.M/N)+H: \qquad \text{equation ②}$$

By comparing the equation ① with the equation ②, It can be understood that the value of the operation reaction force G of the present invention takes a smaller value than the value of the operation reaction force g in the conventional embodiment by the value of the clamping reaction force H.

As described above, since the operation reaction force acting from the housing to the driven portion of the clamp arm through the transmission member becomes small at the time of clamping operation, also the friction forces acting between the housing and the transmission member and between the clamp arm and the transmission member become small. Therefore, the driving means can be so manufactured as to have a small capacity. Further, since the operation reaction force is small also the force acting on the transmission member becomes small, so that the transmission member and the structure members for supporting that member can be manufactured in small sizes.

As noted above, since not only the driving means can be made small in capacity but also the transmission member and so on can be made small in size, the clamping apparatus can be made small in size and light in weight.

BRIEF DESCRIPTION OF THE DRAWINGS

FIG. 1 is a schematic view of a clamping apparatus, FIG. 1(*a*) shows a retreated condition, FIG. 1 (*b*) shows an advanced condition and FIG. 1 (*c*) shows a clamped condition;

FIG. 2 is a plan view of the clamping apparatus;

FIG. 3 is a side view of the apparatus;

FIG. 4 is a vertical sectional side view of the apparatus;

FIG. 5 is a sectional view taken along the V—V directed line in FIG. 4;

FIG. 6 is a sectional view taken along the VI—VI directed line in FIG. 4;

FIG. 7 is a sectional view taken along the VII—VII directed line in FIG. 5;

FIG. 8 is a sectional view taken along the VIII—VIII directed line in FIG. 5;

FIG. 9 shows a variant example of resilient means provided in the apparatus and is a view corresponding to FIG. 7;

FIG. 11 is a view corresponding to FIG. 4;

FIG. 17 is a view showing effects of a clamped condition holding spring provided in the apparatus;

FIG. 18 is a partial view corresponding to FIG. 11;

FIG. 19 is a sectional view taken along the XIX—XIX directed line in FIG. 18;

FIG. 20 is a sectional view taken along the XX—XX in FIG. 19 and is a view showing a supporting constitution for an eccentric transmission member;

DESCRIPTION OF THE PREFERRED EMBODIMENTS

First Embodiment

Figure 1:
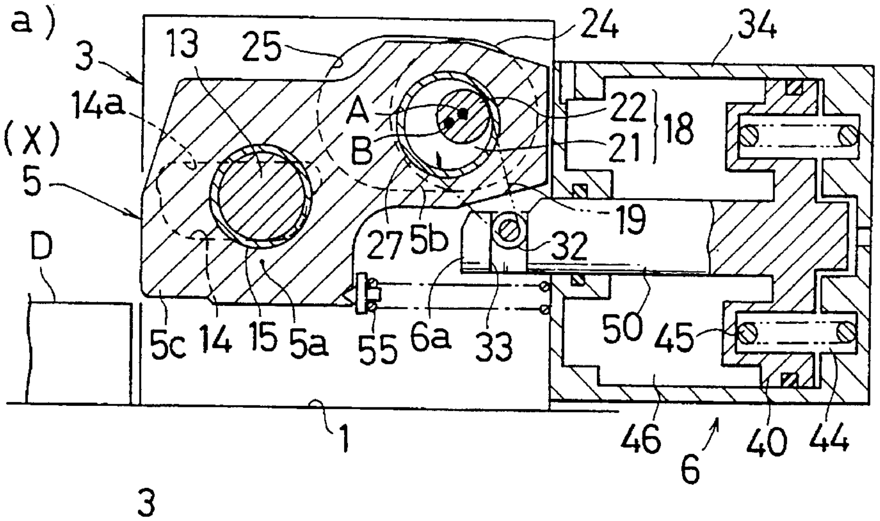
FIGS. 1 through 9 show a first embodiment of the present invention.
Figure 1:
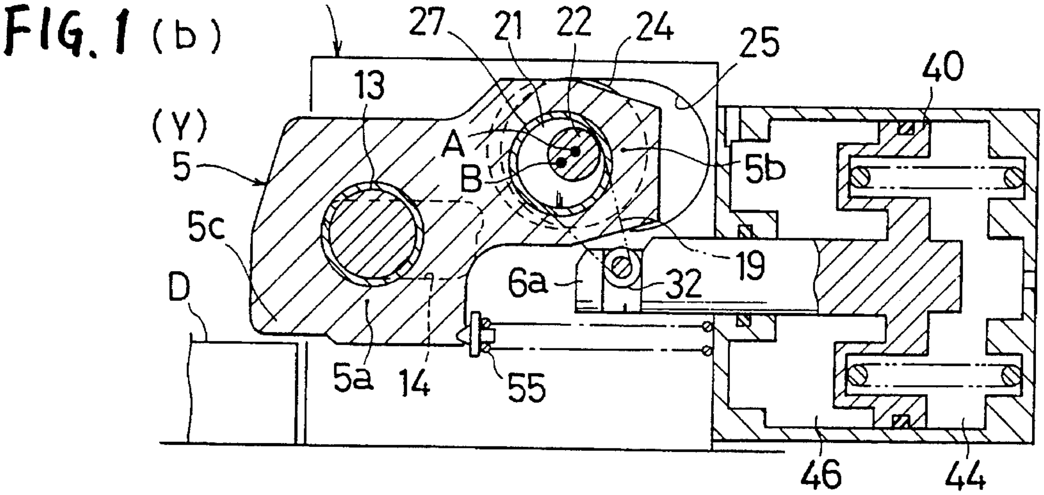
Figure 1:
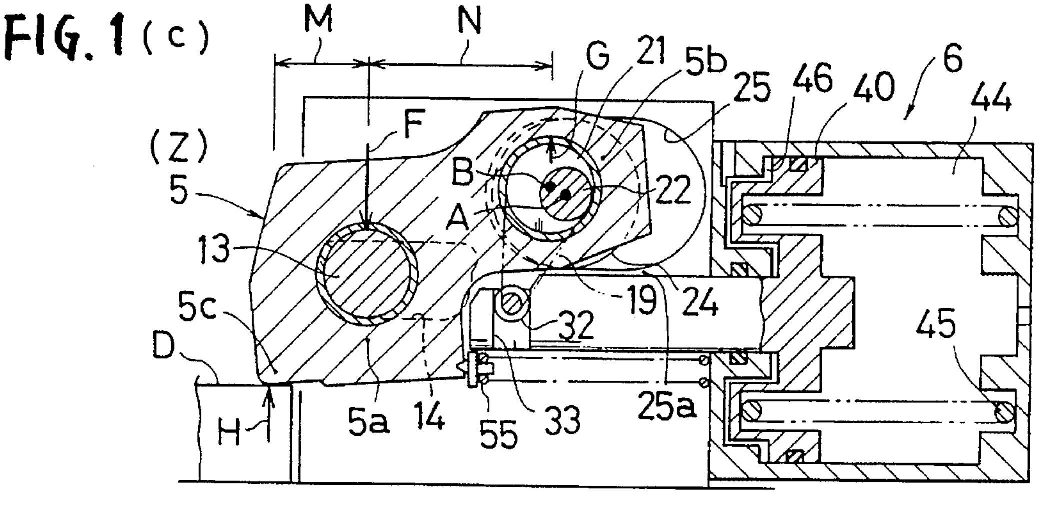
Figure 2:
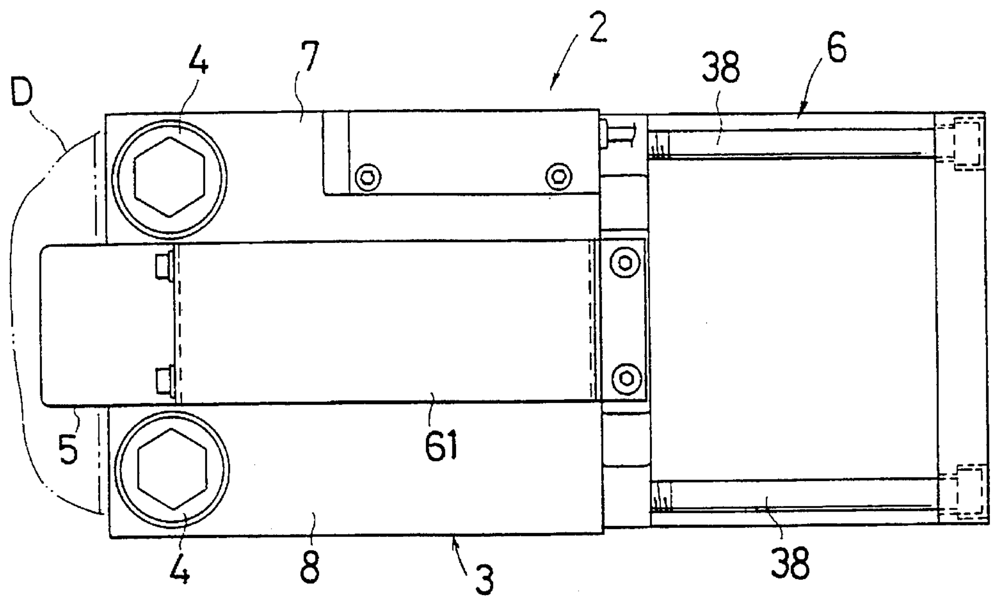
Figure 3:
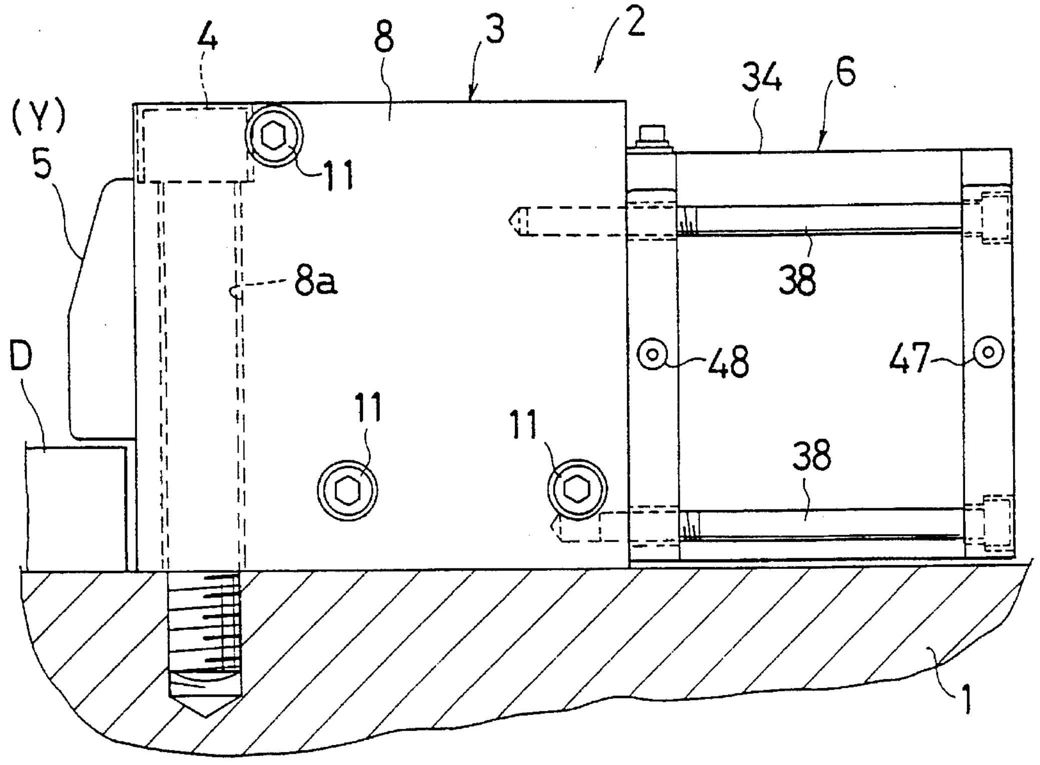

FIGS. 1 through 9 show a first embodiment of the present invention. Firstly, a constitution of a clamping apparatus will be explained with reference to FIGS. 2 through 8.

A clamping apparatus 2 extending in the front and rear direction (namely, in the left and right direction in FIGS. 2 through 4, and the same shall apply hereinafter.) is fixedly secured onto a stationary table 1 of an injection molding machine. A housing 3 of the clamping apparatus 2 is fixedly secured onto the stationary table 1 by two bolts 4, and a metal mold D is adapted to be pressed onto the upper surface of the stationary table 1 by a clamp arm 5 projected forward from the housing 3. The arm 5 is adapted to be driven by a pneumatic cylinder 6 serving as driving means.

The housing 3 comprises left and right (namely, left and right in FIGS. 5 and 6, and the same shall apply hereinafter.) blocks 7, 8, upper and lower blocks 9, 10 and a plurality of bolts 11 for tightening these four blocks 7, 8, 9, 10 integrally to one another. The arm 5 is so interposed between the left and the right blocks 7, 8 as to be movable in the front and rear direction and vertically swingable. Bolt holes 7*a*, 8*a* are formed as vertical through holes in the front portions of the left and the right blocks 7, 8.

A fulcrum portion 5*a* is provided in a midway portion of the clamp arm 5 in the front and rear direction, a driven portion 5*b* is provided in a rear portion of the arm 5, and a clamping portion 5*c* is provided in a front portion of the arm 5.

The fulcrum portion 5*a* is so supported by the housing 3 through a pivot pin 13 extending in the left and right direction as to be movable in the front and rear direction and vertically pivotable.

When explaining more in detail, guide grooves 14 extending in the front and rear direction are formed in the respective inner surfaces of the left and the right blocks 7, 8, and left and right end portions of the pivot pin 13 are fitted into the respective grooves 14. Receiving surfaces 14*a* of the guide grooves 14 are opposed from above to support planes 13*a* so formed in the pin end portions as to face upward. Left and right, two slide bearings 15 are externally fitted around a mid portion of the pivot pin 13 in the left and right direction, and a through hole 16 formed in the fulcrum portion 5*a* is externally fitted around the slide bearings 15, 15.

Further, urethane rubbers E as resilient means are mounted between respective front walls of the left and the right blocks 7, 8 and the respective end portions of the pivot pin 13. These rubbers E are formed spherically and fitted into concave holes 17 formed in the front peripheral surface of the pivot pin 13.

The driven portion 5*b* is connected to an output portion 6*a* of the pneumatic cylinder 6 through a transmission member 18 of an eccentric type and a lever 19 to be driven to swing vertically by the advancing and retreating of the output portion 6*a* in the front and rear direction.

When explaining more in detail, the transmission member 18 comprises a first shaft 21 and left and right second shafts 22, 22 protruded integrally from opposite end surfaces of the first shaft 21. An axis A of the second shaft 22 and an axis B of the first shaft 21 are offset to each other. Other slide bearings 23 are forcibly pressed into rollers 24 as rolling members so as to be fixed therein with inner peripheral surfaces of the bearings 23 externally and rotatably fitted around the second shafts 22. On one hand, support grooves 25 extending in the front and rear direction are formed in respective inner surfaces of the left and the right blocks 7, 8. The rollers 24 are fitted into the support grooves 25. Left and right, two needle roller bearings 27 are externally fitted around the first shaft 21, and a through bole 28 of the driven portion 5*b* is externally fitted around these bearings 27, 27.

Further, an upper end portion 19a as one end portion of the lever 19 is so externally fitted around a right portion of the first shaft 21 and the right second shaft 22 as not to rotate relatively. The upper end portion 19*a* is inserted into a swing allowing groove 29 concavely formed in the right surface of the clamp arm 5. A lower end portion 19*b* as the other end portion of the lever 19 is swingably and vertically movably connected to the output portion 6*a* of the pneumatic cylinder 6. That is, another roller 32 is rotatably supported by a slide bearing 31 fitted around a pin 30 provided in the lower end portion 19*b* of the lever 19, and the roller 32 is inserted into a vertical groove 33 of the output portion 6*a*.

A cylinder portion 34 of the pneumatic cylinder 6 comprises front and rear end plates 35, 36 and a cylinder tube 37 with the rear end plate 36 pushed toward the left and the right blocks 7, 8 by four long bolts 38. A piston 40 is airtightly inserted into the cylinder tube 37. The symbol 41 designates an O-ring, and the symbol 42 does a plastic liner. The piston 40 can be lightly moved due to self-lublication of this liner 42.

A clamping actuation chamber 44 is formed between the piston 40 and the rear end plate 36, and a clamped condition holding spring 45 is mounted within the clamping actuation chamber 44. An unclamping actuation chamber 46 is formed between the piston 40 and the front end plate 35. The symbols 47 and 48 designate a compressed air supply port and a compressed air discharge port respectively. Incidentally, an available pressure of the compressed air is from ab. 4 $kgf/cm^2$ to 5 $kgf/cm^2$. Herein, 1 $kgf/cm^2$ equals to ab. 0.098 MPa (Mega Pascal).

A piston rod 50 protruded forward from the piston 40 is airtightly inserted into the front end plate 35. The symbol 51 designates an O-ring, and the symbol 52 does a plastic liner. The piston rod 50 can be moved lightly due to self-lublication of this liner 52. Incidentally, the output portion 6*a* is provided in the front end portion of the piston rod 50.

An advancing spring 55 is mounted between the front end plate 35 and the lower end portion of the clamping arm 5. The symbol 56 designates a front spring retainer, and the symbol 57 does a rear spring retainer. A driven portion 59 for retreating is provided in a rear wall lower portion of the swing allowing groove 29 of the clamp arm 5.

Incidentally, the arm 5 is urged clockwise about the pivot pin 13 by the urging force of the spring 55. Thereby, since the driven portion 5*b* of the arm 5 pushes the rollers 24 downward through the first shaft 21 and the second shaft 22 in order, the rollers 24 are always brought into contact with a support walls 25*a* of the support grooves 25.

Further, the upper side of the clamp arm 5 is covered by a cover plate 61 fixedly secured to tile upper block 9. An upper side dust cover 62 is constituted by a front bent portion of the cover plate 61. A lower side dust cover 63 is fixed to the lower block 10. A clamped condition detecting switch 66 and an unclamped condition detecting switch (not illustrated) are disposed at a front portion and at a rear portion of tile left block 7 respectively. These switches are adapted to detect a position of a magnet 67 fixed to the left surface of the second shaft 22.

As shown mainly in FIG. 1, the clamping apparatus 2 functions as follows. FIG. 1 (*a*) shows a retreated condition, FIG. 1 (*b*) shows an advanced unclamped condition, and FIG. 1 (*c*) shows a clamped condition.

In the retreated condition of FIG. 1 (*a*), the compressed air is discharged from the clamping actuation chamber 44 and the compressed air is supplied to the unclamping actuation chamber 46. Thereby, the piston 40 and the piston rod 50 are moved rearward (rightward in Figs.), so that the clamp arm 5 is changed over to a retreated position X by the lever 19.

When clamping the metal mold D by the arm 5, the compressed air is discharged from the unclamping actuation chamber 46 and the compressed air is supplied to the actuation chamber 44 to move the piston 40 and the piston rod 50 forward (leftward in Figs.). Thereby, firstly the arm 5 is moved forward by the advancing spring 55 along the guide grooves 14 and the support grooves 25, and then as shown in FIG. 1 (*b*), the pivot pin 13 is received by the front walls of the guide grooves 14 so that the arm 5 is changed over to an advanced position Y.

Thereupon, as shown in FIG. 1 (*c*), the lever 19 is swung clockwise and the first shaft 21 is rotated clockwise about the axis A of the second shaft 22. Thereby, since the driven portion 5*b* of the arm 5 is swung upward about the pivot pin 13, the clamping portion 5*c* is swung downward about the pivot pin 13 firstly to be brought into contact with the upper surface of the metal mold D and subsequently to strongly press the metal mold D. Thereby, the arm 5 is changed over to an illustrated clamping position Z.

Although the axis B of the first shaft 21 is moved forward (leftward in Figs.) a little and also the second shaft 22 is moved forward at the time of rotation of the first shaft 21, since the rollers 24 are rolled along the support grooves 25, the second shaft 22 can be moved lightly due to small friction resistance.

At the beginning of the clamping operation, since the clamping portion 5*c* starts to be brought into contact with the metal mold D and simultaneously the operation reaction force starts to be applied from the receiving surfaces 14*a* of the guide grooves 14 to the support surfaces 13*a* of the pivot pin 13, the forward movement (the leftward movement in Figs.) of the pivot pin 13 is prevented by the friction force acting between both those surfaces 14*a*, 13*a*.

But, at the end of clamping operation, as shown in FIG. 1 (*c*), since the large clamping reaction force H acts from the metal mold D to the clamping portion 5*c* and the larger fulcrum reaction force F acts from the pivot pin 13 to the fulcrum portion 5*a*, the clamp arm 5 deforms resiliently and strongly moves the pivot pin 13 forward. Thereupon, since the rubbers E are compressedly deformed allowing the pivot pin 13 to move forward, abnormal force is not imposed to the pivot pin 13 and the front walls of the guide grooves 14.

Incidentally, under the clamped condition, the operation reaction force G acting from the housing 3 to the driven portion 5*b* through the second shaft 22 and the first shaft 21 is expressed as G=F−H=H.M/N by balancing vertical forces and balancing moments. Therefore, the operation reaction force G is smaller than the fulcrum reaction force F by the clamping reaction force H. In addition thereto, the operation reaction force G becomes smaller than the clamping reaction force H by making a value of the leverage (M/N) of the clamp arm 5 smaller than 1.

Under the clamped condition, the clamp arm 5 is strongly held at the clamping position Z by a resilient force of the clamped condition holding spring 45. Incidentally, in the clamping apparatus of this embodiment, even if an external force which is ab. 1.3 to 2 times as large as the clamping reaction force H acts on the metal mold D, the clamping condition of the arm 5 can be prevented from being cancelled. Further, even in case that the pressure within the clamping actuation chamber 44 disappears due to leakage of the compressed air from feed pipings, a clamping holding force which is ab. 20% to 40% of the clamping reaction force H can be secured by an effect of the spring 45. When cancelling the clamped condition of FIG. 1 (*c*), the compressed air is discharged from the clamping actuation chamber 44 and the compressed air is supplied to the unclamping actuation chamber 46 so that the piston 40 and the piston rod 50 are moved rearward (rightward in Figs.).

Figure 4:
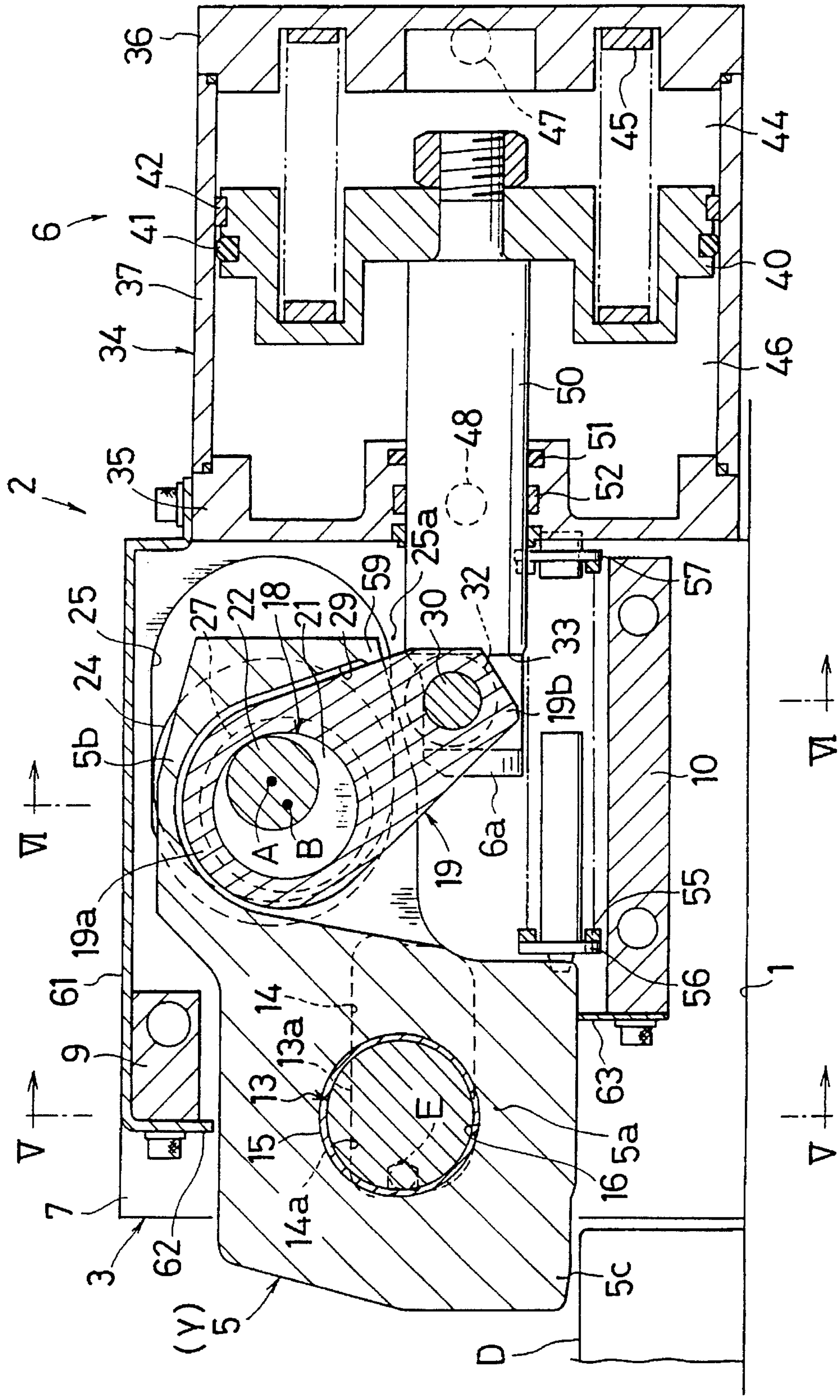
Figure 5:
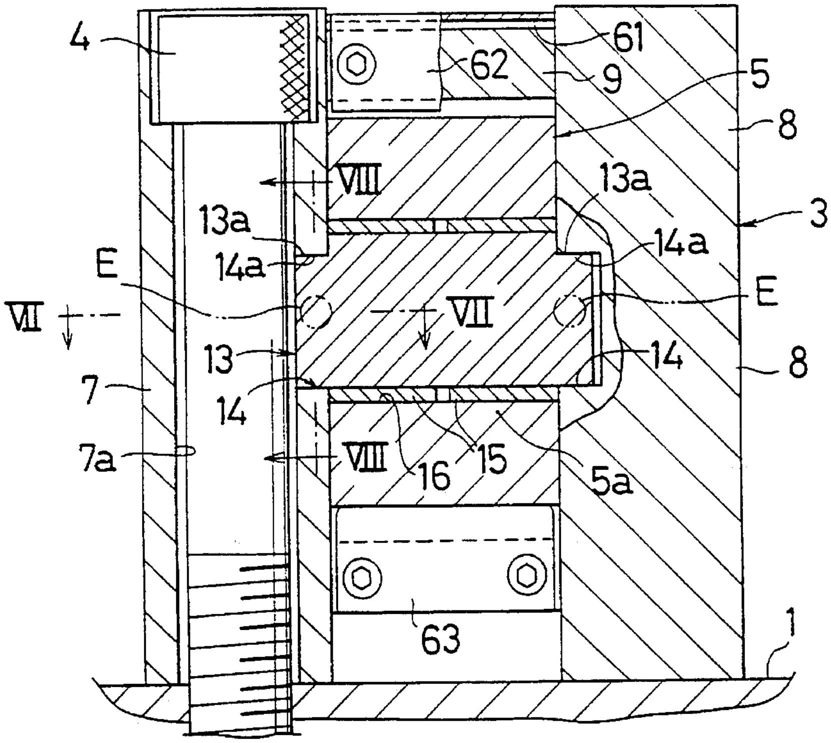
Figure 6:
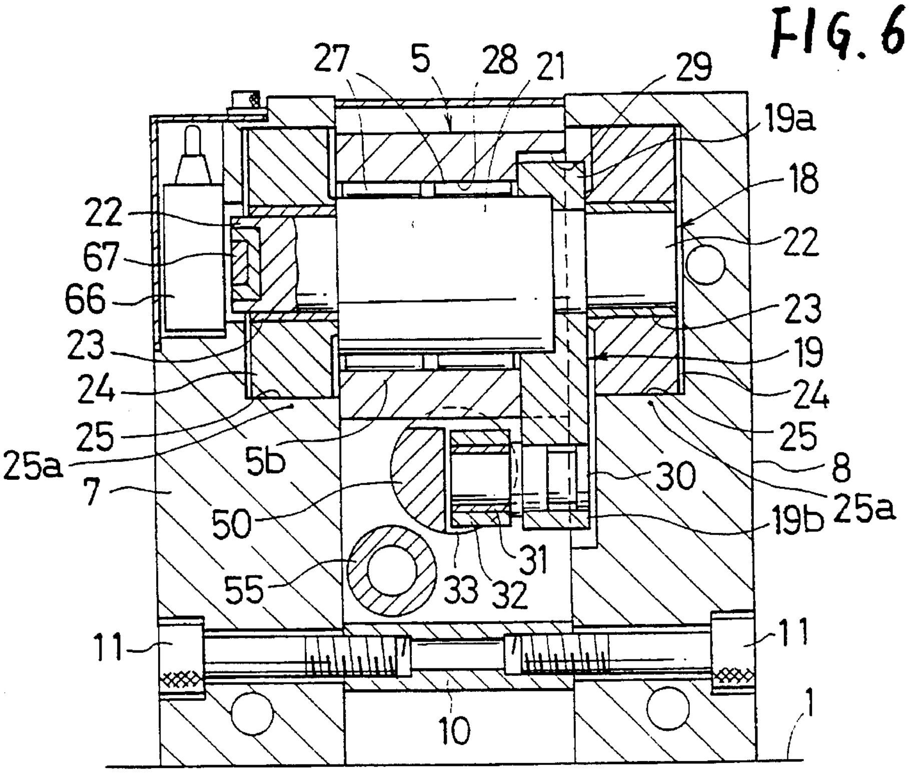

Thereupon, the first shaft 21 is rotated counter-clockwise about the axis A of the second shaft 22 by the swinging of the lever 19 to release the clamping operation force. Then, as shown in FIG. 1 (*b*), the advancing spring 55 serves to swing the damp arm 5 to the advanced position Y. Subsequently, as shown in FIG. 4, the rear surface (the right surface in Fig.) of the lever 19 engages with the driven portion 59 for retreating provided in the rear portion of the arm 5 so as to change over the arm 5 to the retreated position X of FIG. 1 (*a*).

According to the above-mentioned embodiment, the following advantages can be obtained.

As mentioned above, since the operation reaction force is expressed as G=H.M/N, it becomes possible to make the operation reaction force G smaller than the clamping reaction force H by making the value of M/N smaller than 1. Therefore, the force acting on the driven portion 5*b* becomes small at the end of the clamping operation and also the friction forces acting between the transmission member 18 and the housing 3 and between that member 18 and the clamp arm 5 become small. Since a shift of the driven portion 5*b* during its swinging at the end of the clamping operation can be absorbed by rolling of the roller 24 externally fitted around the second shaft 22 of the transmission member 18, also the friction resistance acting between the second shaft 22 and the housing 3 is small. Further, since the needle roller bearing 27 is provided between the driven portion 5*b* of the damp arm 5 and the first shaft 21 as well as the slide bearings 15 are provided also between the arm 5 and the pivot pin 13, the friction resistance at the time of the clamping operation becomes smaller. Accordingly, it is possible to make the pneumatic cylinder 6 small in capacity.

Further, since the operation reaction force G is small as described above, also the force acting on the transmission member 18 becomes small, so that the transmission member 18 and the structural members for supporting that member 18 can be made small in size.

As noted above, since the pneumatic cylinder 6 can be made small in capacity as well as the transmission member 18 and so on can be made small in size, the clamping apparatus 2 can be made small in size and light in weight.

Since it becomes possible to retreat the clamping portion 5*c* of the damp arm 5 from the upper surface of the metal mold D by changing over the arm 5 from the advanced position Y to the retreated position X, it becomes easy to bring out and bring in the metal mold D vertically.

Further, since a shift of the fulcrum portion 5*c* caused by the resilient deformation of the arm 5 is absorbed by the rubbers E as the resilient means at the end of the clamping operation, it becomes possible to dispose the pivot pin 13 near to the front portion of the housing 3 by thinning the front wall thickness of the housing 3. Thereby, the clamping apparatus 2 can be made light in weight and small in size by shortening the length of the housing 3 in the front and rear direction. Since the resilient means is constituted by the rubber, it can be made compact. Additionally, since it is made from urethane, its durability is high.

Since the upper portion 19*a* of the lever 19 is so externally fitted to both the first shaft 21 and the second shaft 22 of the transmission member 18 as not to rotate relatively, the constitution for fixing the lever 19 to the first shaft 21 can be made simple. Further, since the clamp arm 5 can be changed over from the advanced position Y to the retreated position X by bringing the lever 19 into contact with the driven portion 59 of the arm 5, it becomes unnecessary to provide a mechanism dedicated to retreat the arm 5 to reduce the number of component parts, so that the clamping apparatus can be made simple in constitution and rarely gets out of order. Since the housing 3 comprises the plurality of blocks 7, 8, 9, 10, machining margin can be so decreased as to reduce the material cost.

Figure 7:
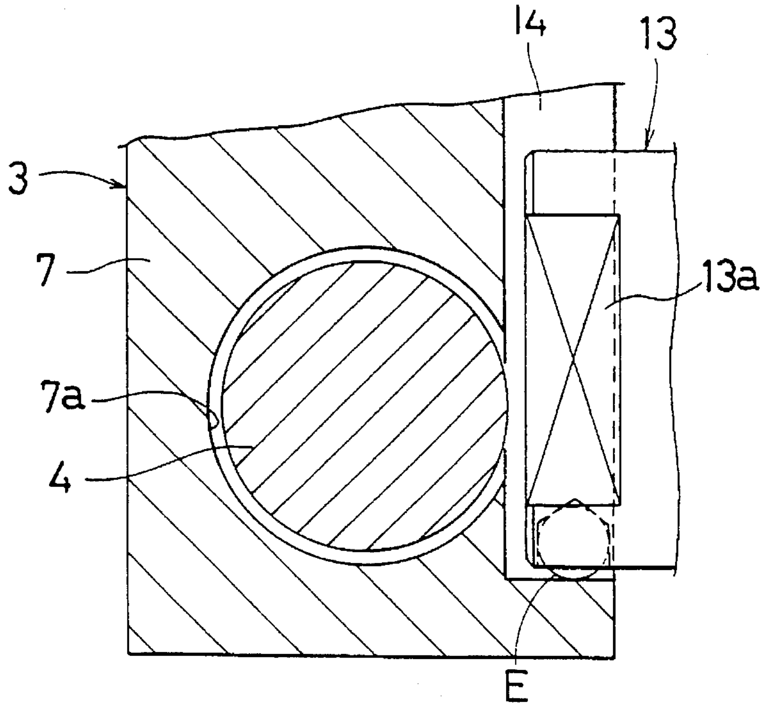
Figure 8:
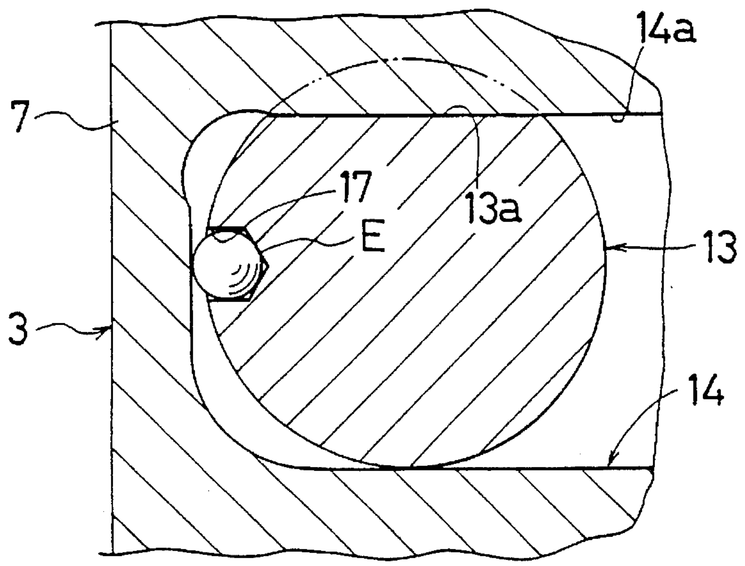
Figure 9:
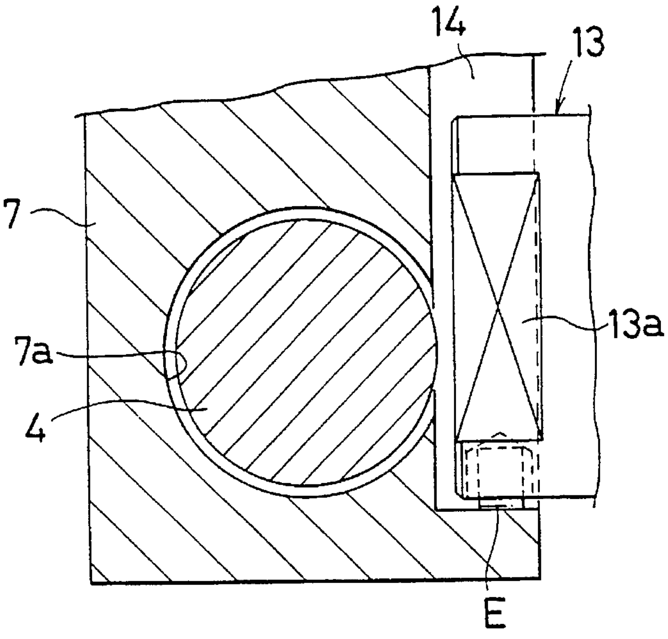

FIG. 9 shows a variant example of the first embodiment and is a view corresponding to to FIG. 7. In this case, the rubbers E are formed cylindrically.

The rubbers E in the first embodiment and in the variant example may be mounted to the housing 3 instead of the pivot pin 13. The rubber E may be other kinds of rubbers instead of the urethane rubber. Further, instead of the rubber E, a spring such as a compression coil spring may be employed as the resilient means.

Incidentally, the needle roller bearing 27 may be replaced by the slide bearing. The slide bearings 15, 23, 31 may be replaced by the needle roller bearings.

Though the slide bearing can be constituted by a simple substance such as phosphor bronze and white metal, it is preferable for maintenance-free to use a composite material (so-called a dry metal) composed of a metal base and a self-lubricating plastic.

FIG. 10, FIGS. 11 through 17 and FIGS. 18 through 23 show other embodiments respectively. In these other embodiments, component members having the same constitutions as those in the first embodiment are designated, in principle, by the same symbols.

Second Embodiment

Figure 10:
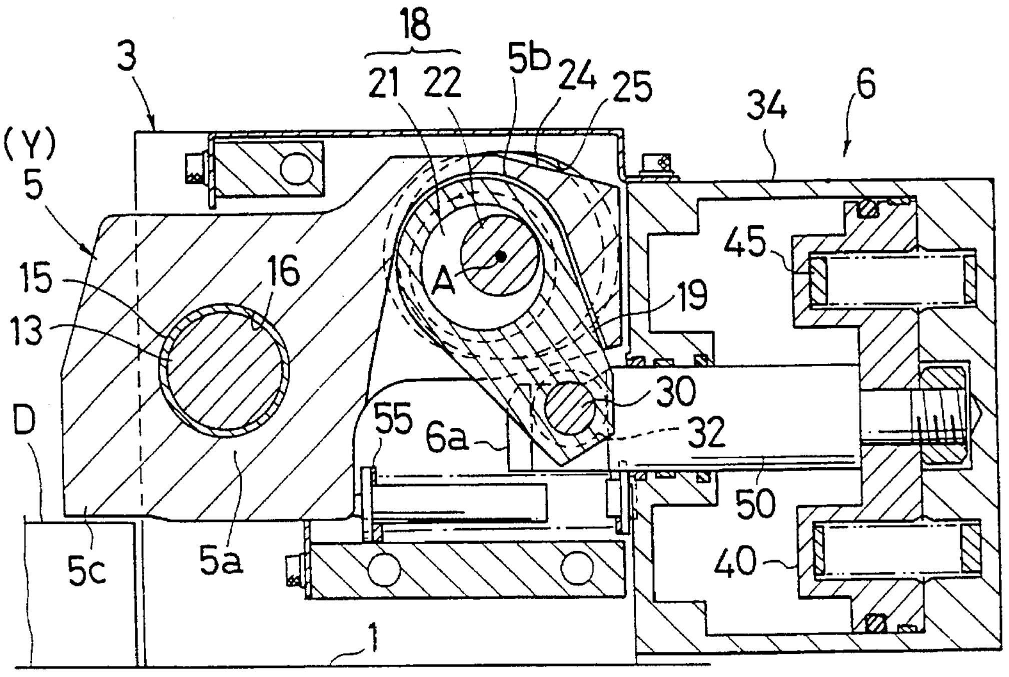
FIG. 10 shows a clamping apparatus of a second embodiment of the present invention and is a view corresponding to FIG. 4.

FIG. 10 shows a second embodiment and is a view corresponding to FIG. 4.

The clamping apparatus of this second embodiment has the following constitutions different from those of the apparatus in the first embodiment. The opposite end portions of the pivot pin 13 are fitted into pin apertures (not illustrated) provided in the housing 3 to be so supported as to be immovable in the front and rear direction. Thereby, the clamp arm 5 can not be advanced and retreated in the front and rear direction (in the left and right direction in Fig.) but can be swung at the illustrated position.

Incidentally, the resilient means E (herein, not illustrated) may be provided between the pivot pin 13 and the pin apertures (not illustrated). In this case, the supporting planes are so provided in the pivot pin 13 as to face upward, and the receiving surfaces facing the supporting planes are provided in the pin apertures.

Further, the second embodiment can be varied as follows.

Instead that the second shaft 22 of the transmission member 18 is so supported by the housing 3 as to be movable in the front and rear direction, it may be so supported by the housing 3 as to be prevented from moving in the front and rear direction. Further, instead that the pivot pin 13 is so supported by the housing 3 as to be prevented from moving in the front and rear direction, it may be so supported by the housing 3 as to be movable in the front and rear direction. In this variant example, when the fulcrum portion **5*a* undergoes a swinging shift in the front and rear direction during clamping actuation, such swinging shift can be absorbed by the movement of the pivot pin 13** in the front and rear direction.

Third Embodiment

FIGS. 11 through 17 show a third embodiment. Firstly, with reference to FIGS. 11 through 14, constitutions of the clamping apparatus of this third embodiment different from those of the first embodiment will be explained hereinafter.

The guide grooves 14 are inclined rearward upward at a predetermined angle θ. This angle θ is preferably set within the range of ab. 3 to 10 degree and is set to ab. 5 degree in this embodiment.

The transmission member 18 comprises the first shaft 21 of a large diameter and the second shaft 22 of a small diameter formed separately from each other, with the first shaft 21 externally fitted around the second shaft 22. The first shaft 21 and the lever 19 are formed integrally.

Another lever 70 is protruded downward from the lower end portion **19*b* of the lever 19. A roller 71 serving as a fulcrum portion for amplification is supported by the protruded portion of that another lever 70 through a pin 73. The roller 71 is adapted to be received from behind by a stopper wall 72 provided in the housing 3**.

All of the bearings 27 mounted between the through hole 28 of the driven portion **5*b* of the clamp arm 5 and the first shaft 21 and other bearings 15, 23, 31** and so on comprise the slide bearings.

A rear spring retainer 57 for the advancing spring 55 is formed cylindrically, and a guide bolt 74 of a front spring retainer 56 is inserted into a cylindrical bore of the rear spring retainer 57. Since the spring 55 can be temporarily tightened between those front and rear spring retainers 56, 57 by that bolt 74, working for mounting the spring 55 to the housing 3 becomes easy.

The clamping apparatus operates as follows.

Figure 12:
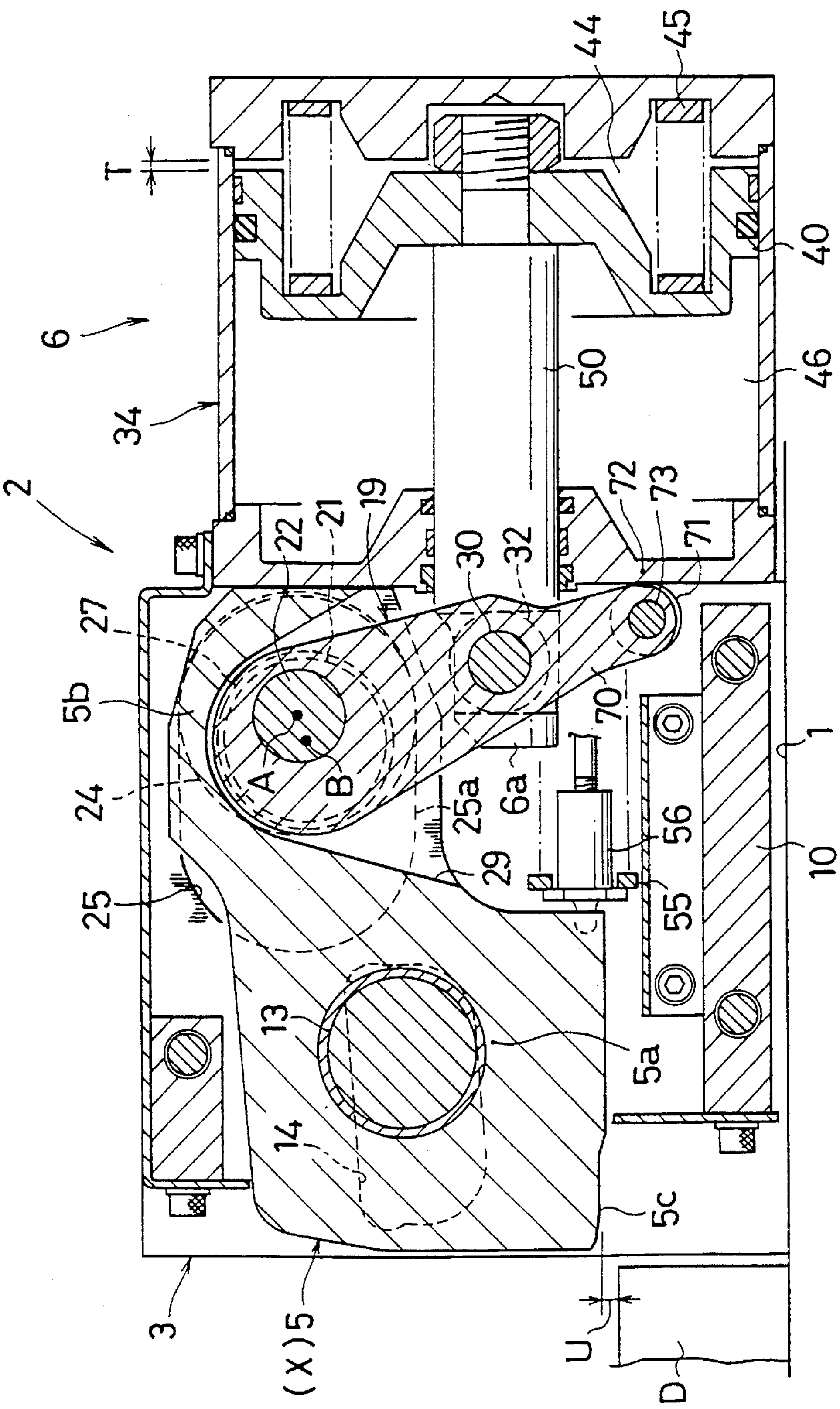
FIG. 12 is a view corresponding to FIG. 1 (*a*)
Figure 13:
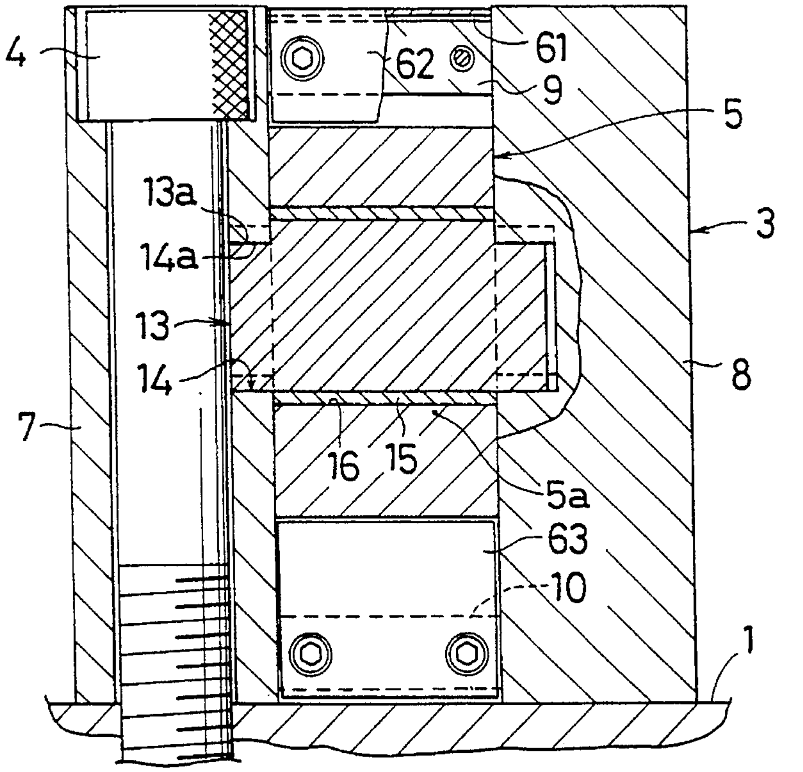
FIG. 13 is a sectional view taken along the XIII—XIII directed line in FIG. 11.
Figure 14:
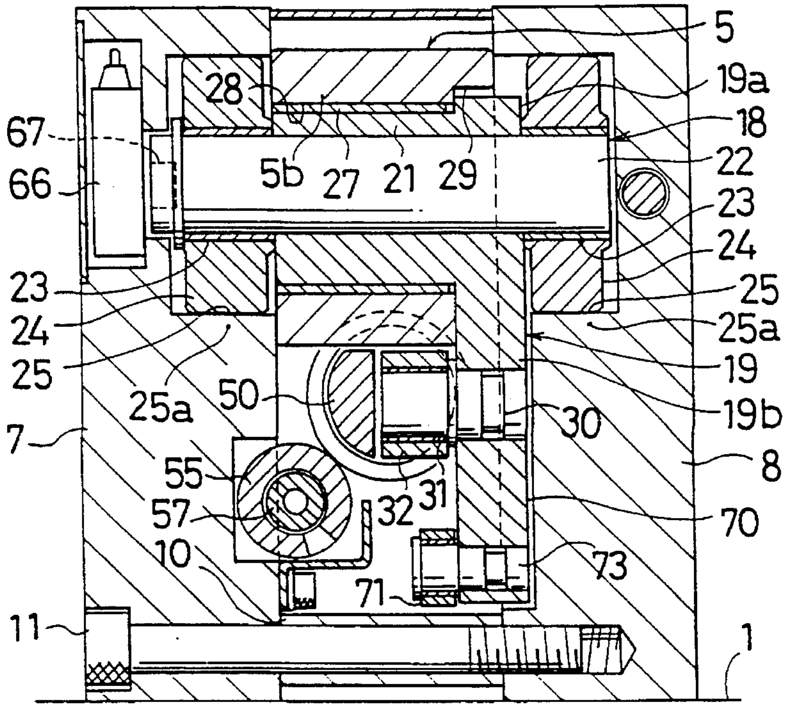
FIG. 14 is a sectional view taken along the XIV—XIV directed line in FIG. 11.

Under the retreated condition of FIG. 12, the piston 40 of the pneumatic cylinder 6 has been driven rightward and the clamp arm 5 has been moved by the lever 19 in the rightward acclivitous direction along the guide grooves 14. At the retreated position X of the clamp arm 5, an unclamping height U is provided between the clamped upper surface of the metal mold D and the lower surface of the clamping portion **5*c***.

When performing the clamping operation, the piston 40 is driven leftward.

Figure 11:
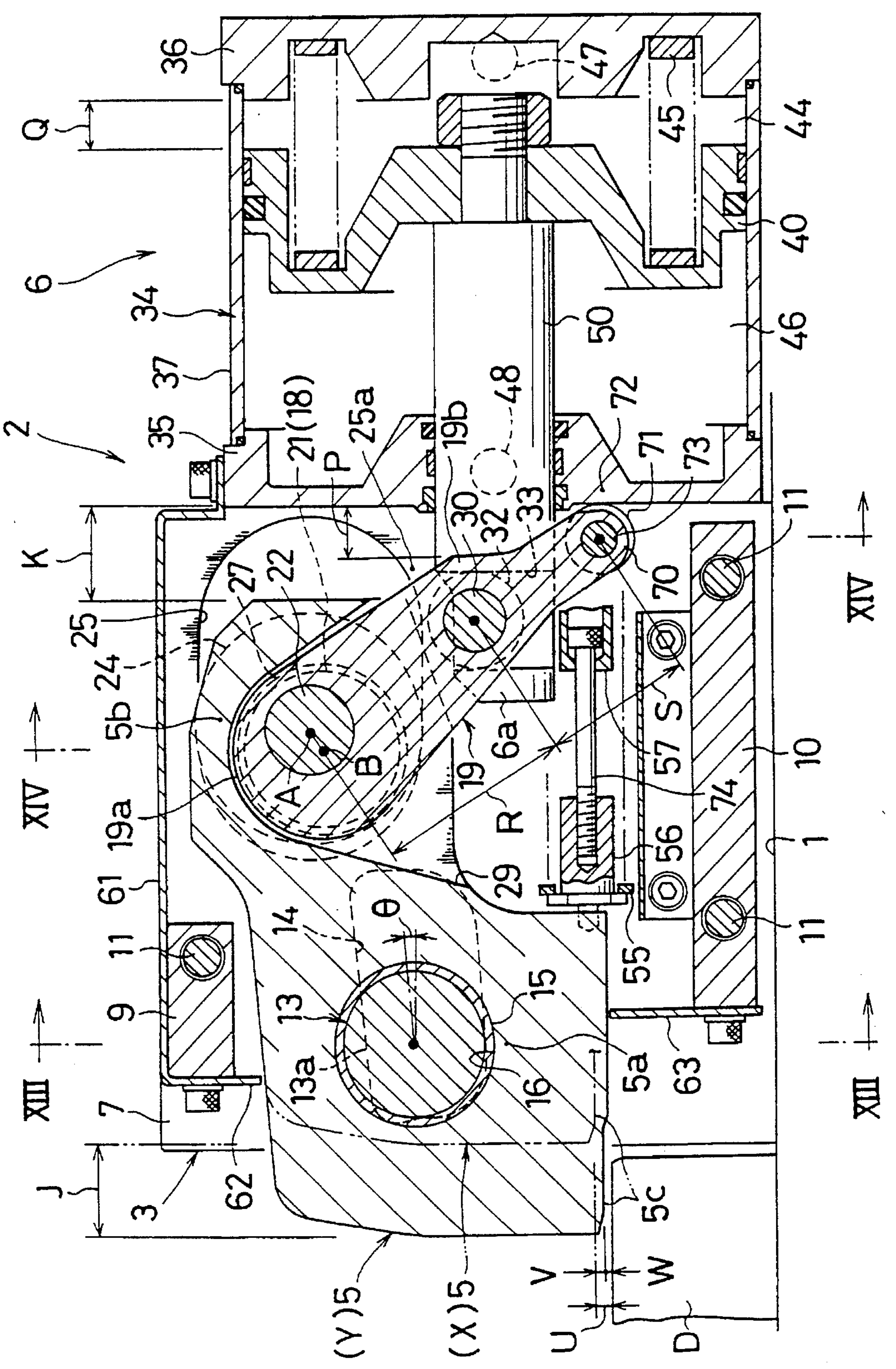
FIGS. 11 and 17 show a third embodiment of the present invention.

Thereupon, firstly as shown in FIG. 11, the clamp arm 5 is moved by the advancing spring 55 in the leftward declivitous direction along the guide grooves 14 and the pivot pin 13 is received by the front walls of the guide grooves 14. The clamping portion **5*c* of the clamp arm 5** is lowered by a retreating height V during the movement from the retreated position X to the advanced position Y.

Subsequently, since the lever 19 is swung clockwise about the transmission member 18, the first shaft 21 is rotated clockwise about the second shaft 22 so that the driven portion **5*b* is swung upward about the pivot pin 13. Thereby, the clamping portion 5*c* is swung downward about the pivot pin 13 to strongly press the metal mold D. The clamping portion 5*c*** is lowered by a release height W during movement from the advanced position Y to the clamped position (not illustrated).

When performing the unclamping operation, the piston 40 is driven rightward under the clamped condition.

Thereupon, the lever 19 is swung counterclockwise about the transmission member 18 and, as shown in FIG. 11, the clamping portion **5*c* is swung upward by the advancing spring 55. At this advanced position Y, the clamping portion 5*c* is spaced apart from the metal mold D by the release height W and the amplification roller 71 is received by the stopper wall 72**.

Therefore, when the piston 40 is further driven rightward, the lever 19 is swung clockwise about the roller 71. Thereby, the arm 5 is moved in the rightward acclivitous direction along the guide grooves 14 to be changed over to the retreated position X of FIG. 12. In this case, a stroke T for retreating margin is left on the right side of the piston 40.

In FIG. 11, the symbols J, K designate a retreating distance of the arm 5 respectively, the symbol P does a retreating margin gap of the lower end portion **19*b* of the lever 19, and the symbol Q does a retreat allowing stroke of the piston 40. The symbol R designates a lever length of the lever 19 and the symbol S does a lever length of another lever 70**.

When the symbol L (not illustrated) designates an advancing and retreating stroke of the piston 40 required for changing over the arm 5 from the advanced position Y of FIG. 11 to the retreated position X of FIG. 12.

L=(Retreat Allowing Stroke Q—Retreating Margin Stroke T)=J.S/(R+S) is presented.

Since a value of S/(R+S) is smaller than 1, a value of the stroke L becomes smaller than the retreating distance J of the arm 5. Therefore, the length of the housing 3 in the front and rear direction becomes shorter.

Incidentally, the value of S/(R+S) is preferably set within the range of 0.33 to 0.5 and is set to ab. 0.4 in this embodiment.

As noted above, since the clamp arm 5 is moved for clamping and unclamping in the inclined direction relative to the clamped surface of the metal mold D, the arm 5 can be changed over smoothly and securely. When explaining more in detail, in case that the metal mold D is used for a long time, a portion of the clamped surface thereof to be pressed by the clamping portion 5*c* is deformed plastically concavely and an outside area of the pressed portion happens to be swelled out by rusts or burrs produced by collision with other objects. Since the clamping portion 5*c* of the arm 5 is advanced and retreated from above slantly, its interference with the swelled portion can be prevented and its smooth movement can be secured.

Further, since the clamp arm 5 can be raised by the retreating height V due to an inclination of the guide groove 14, the dimension of the release height W can be made smaller by the dimension of the retreating height V in the case that the clamping height U is set to the predetermined value. Therefore, a swinging angle of the arm 5 for release can be made smaller and a releasing stroke of the piston 40 can be made smaller. As a result, the clamping apparatus can be made small in size by decreasing the length of the housing 3 in the front and rear direction.

Since the guide grooves 14 are inclined rearward acclivitously, a horizontal component force acting from the pivot pin 13 to the front walls of the grooves 14 at the time of clamping can be small. Therefore, the housing 3 can be made small in size by thinning the front walls of the guide grooves 14.

Further, since the advancing and retreating stroke L of the piston 40 becomes smaller and additionally a swinging distance of the lower portion 19*b* of the lever 19 becomes shorter due to provision of the amplification roller 71, also a retreating margin gap P for the lower end portion 19*b* can be small. Thereby, the clamping apparatus 2 can be made further smaller in size by decreasing the length of the housing 3 in the left and right direction.

Incidentally, the amplification fulcrum portion provided in above-mentioned another lever 70 may be composed of a sliding member instead of the roller 71.

Figure 15:
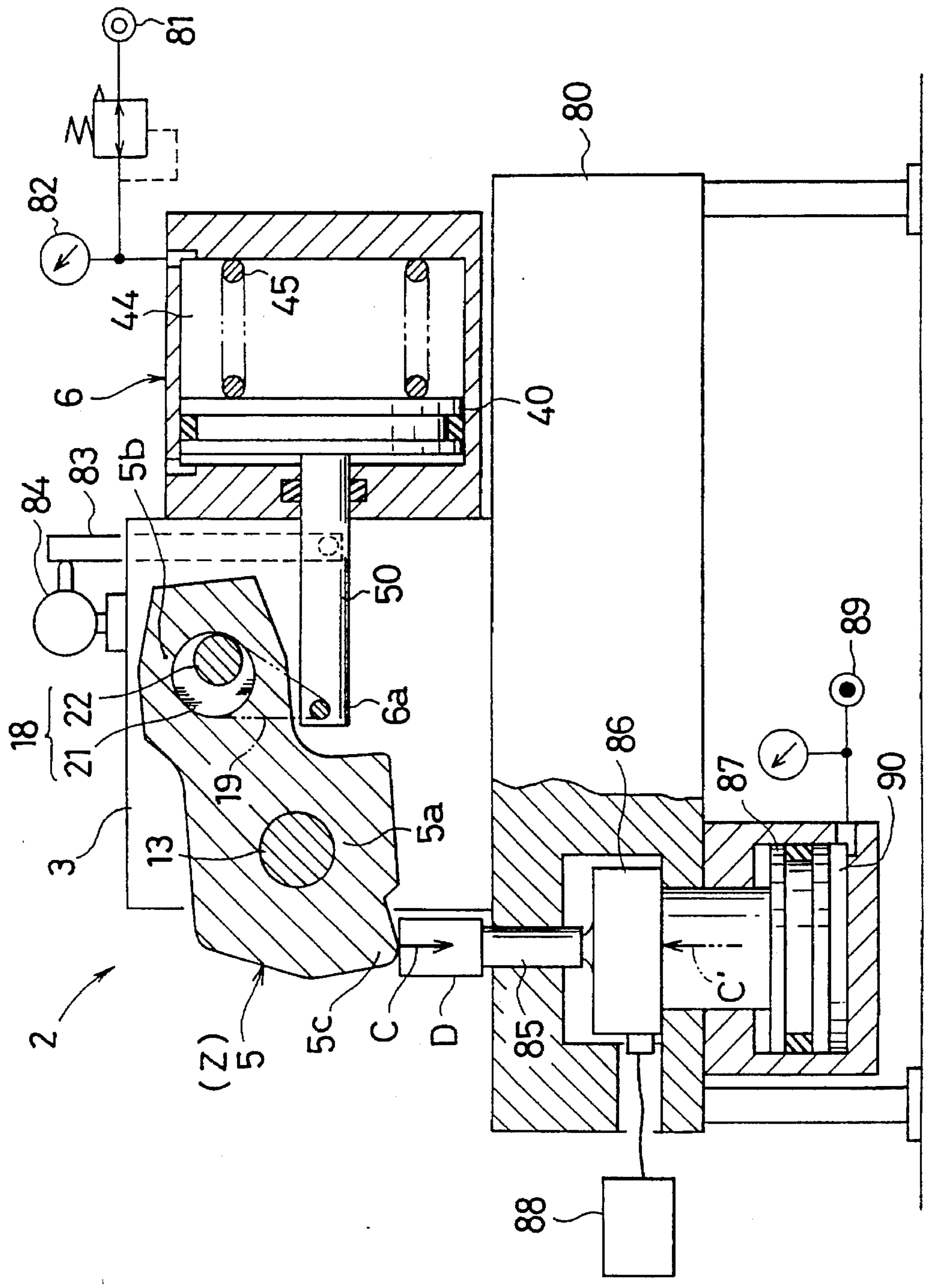
FIG. 15 is a schematic view of a test apparatus for the clamping apparatus.
Figures 16, 17:
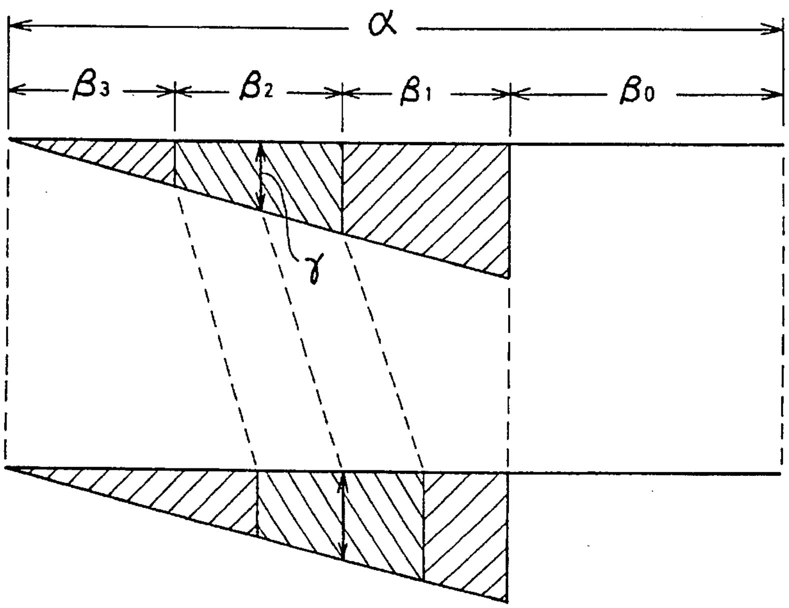
FIG. 16 shows test data about the clamping apparatus.
Figure 18:
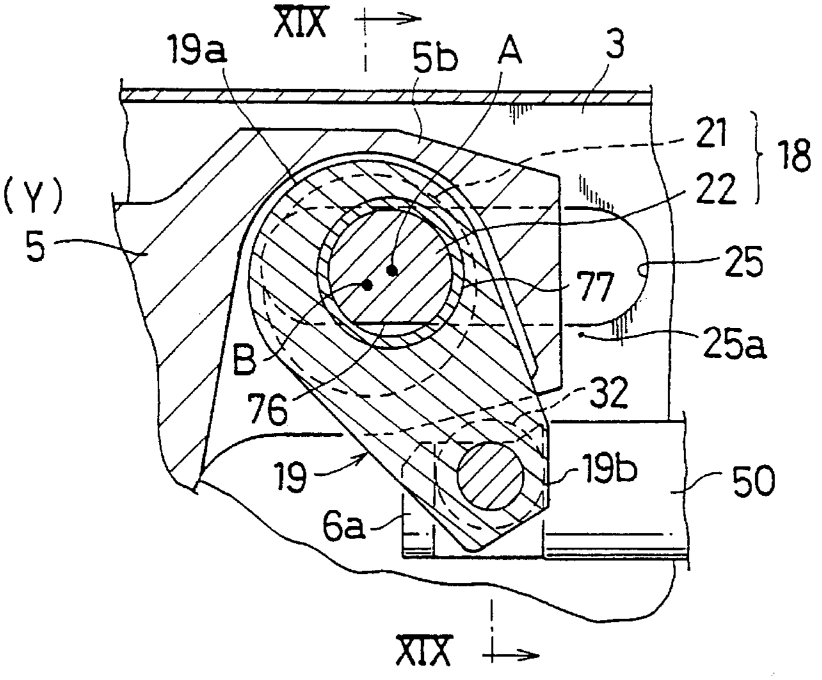
FIGS. 18 through 20 show a clamping apparatus of a fourth embodiment of the present invention.
Figure 19:
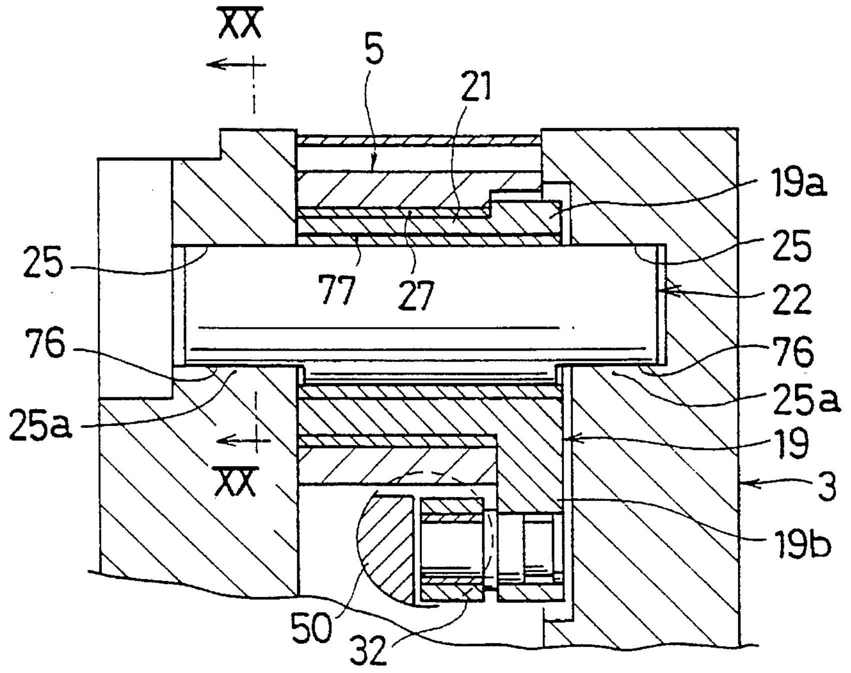

Next, one example of test results about the clamping apparatus 2 according to the third embodiment will be explained with reference to FIGS. 15 through 17. FIG. 15 is a schematic view of a test apparatus. FIG. 16 shows test data. FIG. 17 is a view showing an effect of a clamped condition holding spring provided in the clamping apparatus.

Approximate dimensions of the length, the width and the height of the clamping apparatus 2 are 290 mm, 140 mm and 150 mm respectively.

As shown in FIG. 15, the clamping apparatus 2 is fixedly secured to the upper surface of the table 80, and the compressed air is adapted to be supplied from a pneumatic source 81 to the clamping actuation chamber 44 of the clamping apparatus 2. The symbol 82 designates an air pressure gauge. The piston rod 50 of the pneumatic cylinder 6 is connected to a dial gauge 84 through a link 83. An intermediate pin 85 and a load cell 86 are arranged in order below the object D to be fixed adapted to be pressed downward by the clamp arm 5, and the load cell 86 is adapted to be pushed up by a hydraulic piston 87. The symbol 88 designates a load indicator, and the symbol 89 does a hydraulic pressure source such as a hand pump.

A clamping force C of the clamp arm 5 is measured as follows. While the pressurized oil is discharged from a hydraulic actuation chamber 90 below the hydraulic piston 87 and a pressure within the clamping actuation chamber 44 is increased, the clamping force C is measured by the load indicator 88 at every predetermined pneumatic pressure. The measurement data are as shown in FIG. 16. That is, when the pneumatic pressure is changed from 0 $kgf/cm^2$ to 6 $kgf/cm^2$, the clamping force changes from 2.0 tf to 11.3 tf. Herein, 1 $kgf/cm^2$ is ab. 0.098 MPa (Mega Pascal), and 1 tf (=1000 kgf) is ab. 9810 N (Newton). Incidentally, when the pneumatic pressure is zero, the clamping force C is given by the clamped condition holding spring 45.

A clamping cancellation force C' exerted when the clamping condition of the clamp arm 5 is cancelled is measured as follows.

The load cell 86 is pushed up by increasing the pressure within a hydraulic actuation chamber 90 under each clamped condition corresponding to every above-mentioned pneumatic pressure. Under such a condition that the arm 5 is held at the illustrated clamped position Z, the piston rod 50 is held at the illustrated position. But, when the arm 5 starts to be moved toward the unclamping side, the piston rod 50 starts to be moved rightward. This is confirmed by the dial gauge 84 and then a value indicated by the load indicator 88 is read to take the value as the clamping cancellation force C'. The measurement data of the clamping cancellation force C' are as shown in FIG. 16.

According to the data, the followings can be understood. The clamping cancellation force C' is required to have such a large value as being ab. 1.3 times to 1.7 times as large as the clamping force C. Therefore, during the clamping operation, the clamp arm 5 is hardly cancelled from the clamping condition, so that the object D to be fixed can be strongly held in the clamped condition. Even in case that the pneumatic pressure within the clamping actuation chamber 44 disappears due to damages of air pipings and so on, the object D to be fixed can be strongly held by the effect of the clamped condition holding spring 45.

The effect of the clamped condition holding spring 45 will be explained by FIG. 17 referring to FIGS. 11 and 12.

When the clamp arm 5 is driven to the retreated position X shown in FIG. 12, the spring 45 having a free length $\alpha$ is compressed until the spring length becomes $\beta_0$. The symbol $\beta_1$ designates an extending and contracting range for advancement and retreat required for the arm 5 to be moved to the retreated position X shown in FIG. 12 and to the advanced position Y shown in FIG. 11. The symbol $\beta_2$ does an extending and contracting range for clamping required for the arm 5 to be swung to the advanced position Y and to the clamping position. The symbol $\beta_3$ indicates a compression amount for an initial setting and the symbol $\gamma$ does an urging force of the spring 45.

As understood by the comparison between the upper view and the lower view in FIG. 17, in the case that the free length $\alpha$ of the spring 45 is set constant, since the compression amount $\beta_3$ for the initial setting can be increased by decreasing the extending and contracting range $\beta_1$ for advancement and retreat, the urging force $\gamma$ in the extending and contracting range $\beta_2$ for clamping becomes large.

Accordingly, as mentioned above, when the advancing and retreating stroke of the piston 40 becomes small due to the effect of the amplification roller 71, the urging force of the spring 45 becomes large, so that the object D to be fixed can be strongly and securely held.

Fourth Embodiment

FIGS. 18 through 23 show a fourth embodiment. In this fourth embodiment, a portion of the third embodiment (refer to FIGS. 11 through 14) is modified as follows.

Sliding surfaces 76 are formed in the lower surfaces of the opposite end portions of the second shaft 22, and the sliding surfaces 76 are brought into slidable contact with the support walls 25a of the support grooves 25 in the front and rear direction. Lubricant is interposed between these sliding surfaces 76 and the support walls 25a. Also between the first shaft 21 and the second shaft 22 there are mounted slide bearings 77.

The driven portion 5b of the clamp arm 5 is, as mentioned above, urged clockwise by the advancement spring (herein, not illustrated). Thereby, the sliding surfaces 76 are pressed onto the support walls 25a. Accordingly, the support groove 25 can be formed as shown by a view depicted by the alternate long and two short dashes line in FIG. 20.

Incidentally, also in the clamping apparatus of the fourth embodiment, roughly the same test results as those of FIG. 16 can be obtained.

Figure 20:
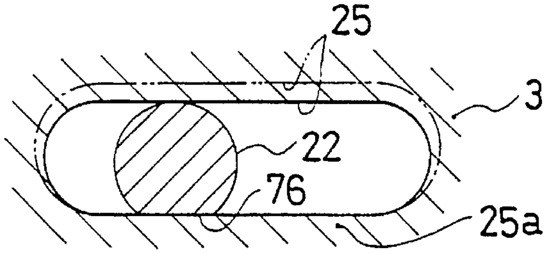
Figure 21:
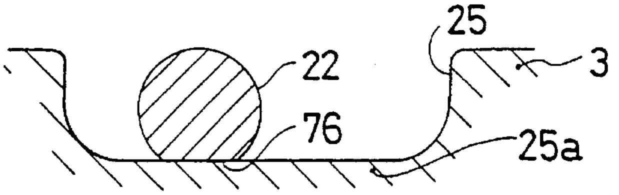
FIG. 21 is a view showing a first variant example of the supporting constitution.
Figure 22:
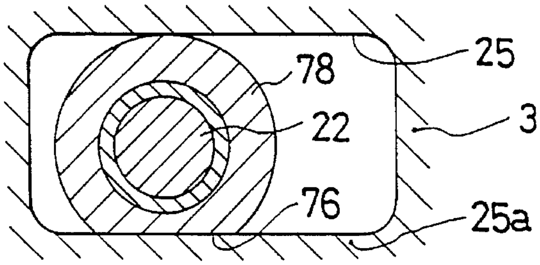
FIG. 22 is a view showing a second variant example of the supporting constitution.
Figure 23:
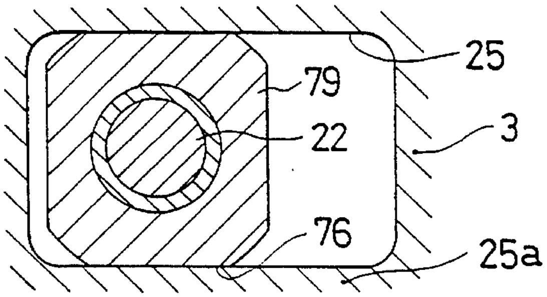
FIG. 23 is a view showing a third variant example of the supporting constitution.
Figure 24:
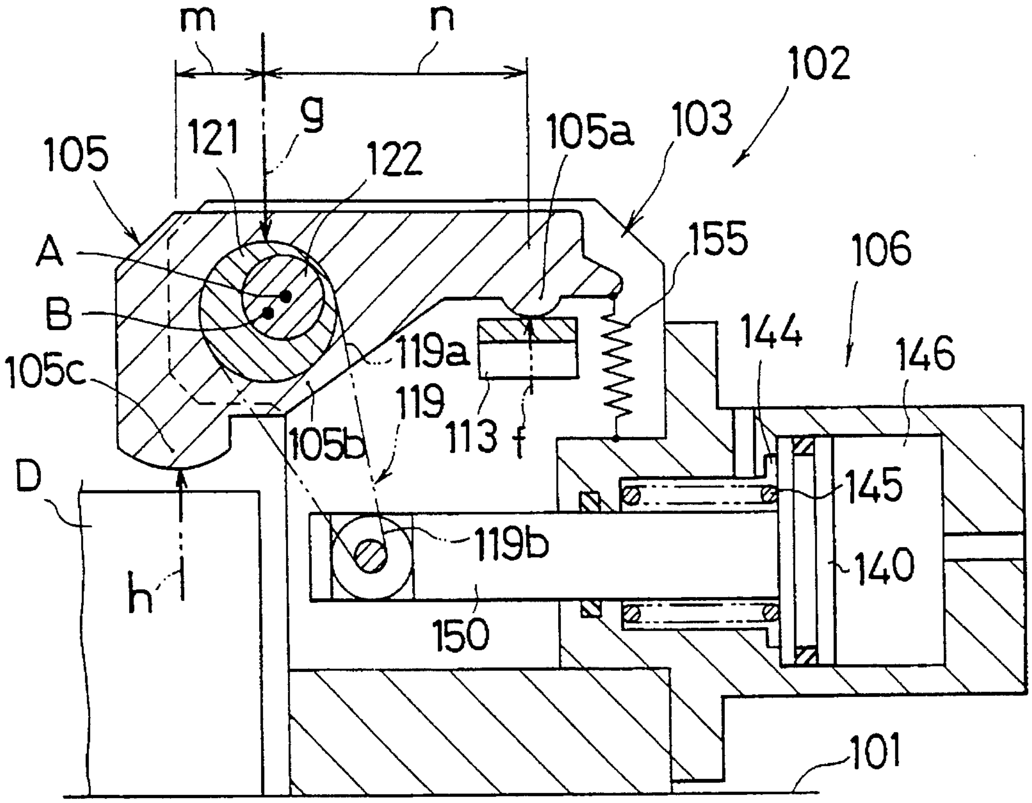
PRIOR ART FIG. 24
FIG. 24 shows a conventional embodiment and is a view corresponding to FIG. 1.

FIGS. 21 through 23 show variant examples of the supporting constitution for the second shaft 22 and are views corresponding to FIG. 20.

In a first variant example shown in FIG. 21, the upper walls of the support grooves 25 are omitted. Incidentally, the sliding surfaces 76 of the second shaft 22 are pressed into contact with the support walls 25a by the urging force of the advancement spring similarly to the fourth embodiment.

In a second variant example shown in FIG. 22, circular guide members 78 are rotatably supported by the end portions of the second shaft 22, and the sliding surfaces 76 are formed in the guide members 78.

In a third variant example shown in FIG. 23, square guide members 79 are rotatably supported by the end portions of the second shaft 22, and the sliding surfaces 76 are formed in the guide members 79.

Each above-mentioned embodiment can be further modified as follows.

Instead that the housing 3 comprises the plurality of blocks 7, 8, 9, 1 0, optionally two, three or all of these plural blocks may be formed integrally.

Instead that the first shaft 21 of the transmission member 18 is fitted into the through hole 28 formed in the driven portion 5b of the clamp arm 5, an arcuate groove may be formed in the driven portion 5b so that the first shaft 21 may be engaged with the groove from below.

In the pneumatic cylinder 6 as the driving means, the clamped condition holding spring 45 may be omitted. And the cylinder 6 of a single acting and spring return type may be used instead of the double acting type one.

Instead of the pneumatic cylinder, the driving means may employ such a cylinder using other kinds of compressed gases. Instead of these gas pressure cylinders, a hydraulic cylinder and the like may be used. Incidentally, in the case that the compressed air is used as the pressurized fluid, costs of a pressurized fluid supply/discharge device and a piping can be reduced remarkably, and the atmosphere can be prevented from being contaminated by liquid such as oil and the like.

Further, the driving means may be such a mechanism adapted to be advanced and retreated through an engagement between an external thread and an internal thread.

It will be apparent from the foregoing that, while particular forms of the invention have been illustrated and described, various modifications can be made without departing from the spirit and scope of the invention. Accordingly, it is not intended that the invention be limited, except as by the appended claims.

What is claimed is:

1. A clamping apparatus comprising:

a housing (3);

a clamp arm (5) having a midway portion and a rear portion in the front and rear direction;

a fulcrum portion (5a) disposed in the midway portion of the clamp arm (5) and supported vertically pivotably by the housing (3);

a driven portion (5b) disposed in the rear portion of the clamp arm (5);

a transmission member (18) having a first shaft (21) transmittably engaged with the driven portion (5b) and a second shaft (22) supported by the housing (3) with an axis (A) of the second shaft (22) and an axis (B) of the first shaft (21) being offset to each other;

driving means (6) having an output portion (6a); and a lever (19) adapted to connect the first shaft (21) and the output portion (6a) to each other;

the first shaft (21) being eccentrically rotated about the axis (A) by swinging the lever (19) by the output portion (6a).

2. A clamping apparatus as set forth in claim 1, wherein a support wall (25a) for supporting the second shaft (22) movably in the front and rear direction is provided in the housing (3).

3. A clamping apparatus as set forth in claim 2, wherein a rolling member (24) adapted to be brought into rolling contact with the support wall (25a) in the front and rear direction is provided in the second shaft (22).

4. A clamping apparatus as set forth in claim 2, wherein a sliding surface (76) adapted to be brought into sliding contact with the support wall (25a) in the front and rear direction is provided in the second shaft (22).

5. A clamping apparatus as set forth in claim 1, wherein a guide groove (14) extending in the front and rear direction is formed in the front portion of the housing (3), and the fulcrum portion (5a) of the clamp arm (5) is supported movably in the front and rear direction by the guide groove (14).

6. A clamping apparatus as set forth in claim 5, wherein the guide groove (14) is inclined reawardly upwardly at a predetermined angle ($\theta$).

7. A clamping apparatus as set forth in claim 6, wherein the lever (19) has one end portion (19a) and the other end portion (19b) with the one end portion (19a) being connected to the first shaft (21) and the other end portion (19b) being supported vertically swingably by the output portion (6a), and another lever (70) is projected from the other end portion (19b) in the opposed direction to the direction of the one end portion (19a) with a projecting portion of another lever (70) being provided with an amplifying fulcrum portion (71) and the housing (3) being provided with a stopper wall (72) for receiving the fulcrum portion (71) from behind.

8. A clamping apparatus as set forth in claim 1, wherein the housing (3) comprises left and right blocks (7) (8) disposed on both the left and the right sides of the clamp arm (5) and upper and lower blocks (9) (10) for connecting the left and the right blocks (7) (8).

* * * * *